United States Patent
Nauka et al.

(10) Patent No.: US 11,104,069 B2
(45) Date of Patent: Aug. 31, 2021

(54) FINISHING A 3D PRINTED OBJECT

(71) Applicant: Hewlett-Packard Development Company, L.P., Houston, TX (US)

(72) Inventors: Krzysztof Nauka, Palo Alto, CA (US); Vladek Kasperchik, Corvallis, OR (US); Aja Hartman, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 273 days.

(21) Appl. No.: 16/072,144

(22) PCT Filed: May 5, 2016

(86) PCT No.: PCT/US2016/030941
§ 371 (c)(1),
(2) Date: Jul. 23, 2018

(87) PCT Pub. No.: WO2017/192140
PCT Pub. Date: Nov. 9, 2017

(65) Prior Publication Data
US 2019/0030803 A1    Jan. 31, 2019

(51) Int. Cl.
*B29C 64/188* (2017.01)
*B33Y 30/00* (2015.01)
(Continued)

(52) U.S. Cl.
CPC ........ *B29C 64/188* (2017.08); *B23K 26/0006* (2013.01); *B23K 26/354* (2015.10);
(Continued)

(58) Field of Classification Search
CPC ... B29C 64/188; B29C 64/153; B29C 64/393; B33Y 10/00; B33Y 30/00; B33Y 40/00; B33Y 50/02; B23K 26/354
See application file for complete search history.

(56) References Cited

U.S. PATENT DOCUMENTS

| 4,288,678 A | 9/1981 | La Rocca |
| 6,032,040 A * | 2/2000 | Choy .................. H04W 76/10 |
| | | 455/414.1 |

(Continued)

FOREIGN PATENT DOCUMENTS

| CN | 1236899 | 12/1999 |
| EP | 1894704 A1 | 3/2008 |

(Continued)

OTHER PUBLICATIONS

Ramos, J.A. et al. "Surface Over-Melt during Laser Polishing os Indirect-SLS Metal Parts," Materials Research Society Symposium Proceedings, Dec. 5, 2002, Retrieved from the Internet: URL: https://apps.dtic.mil/dtic/tr/fulltext/u2/p014219.pdf.

(Continued)

*Primary Examiner* — Joseph S Del Sole
*Assistant Examiner* — John Robitaille
(74) *Attorney, Agent, or Firm* — Mannava & Kang (57) ABSTRACT

According to an example, in a method, a radiation source that is to output radiation at a preset energy level onto a surface of a three-dimensional (3D) printed object may be activated. In addition, the radiation source may be deactivated after a predefined period of time sufficient to cause an outer portion of about a predetermined thickness of the surface of the 3D printed object to begin to melt to finish the surface of the 3D printed object.

15 Claims, 5 Drawing Sheets

(51) Int. Cl.
*B33Y 40/00* (2020.01)
*B23K 26/354* (2014.01)
*B23K 26/00* (2014.01)
*B23K 26/352* (2014.01)
*B29C 71/02* (2006.01)
*B29C 71/04* (2006.01)
*B33Y 10/00* (2015.01)
*B33Y 50/02* (2015.01)
*B29C 64/153* (2017.01)
*B29C 64/393* (2017.01)
*B23K 103/00* (2006.01)

(52) U.S. Cl.
CPC ........ B23K 26/3576 (2018.08); B29C 64/153 (2017.08); B29C 64/393 (2017.08); B29C 71/02 (2013.01); B29C 71/04 (2013.01); B33Y 10/00 (2014.12); B33Y 30/00 (2014.12); B33Y 40/00 (2014.12); B33Y 50/02 (2014.12); *B23K 2103/00* (2018.08); *B23K 2103/42* (2018.08); *B23K 2103/52* (2018.08); *B29C 2791/009* (2013.01)

(56) References Cited

U.S. PATENT DOCUMENTS

| | | | |
|---|---|---|---|
| 6,504,127 B1 | 1/2003 | McGregor | |
| 8,506,738 B2 * | 8/2013 | Wang | E06B 3/67339 156/104 |
| 8,653,409 B1 * | 2/2014 | Sodhi | G06F 19/00 219/121.66 |
| 2008/0054531 A1 | 3/2008 | Kerekes et al. | |
| 2009/0283119 A1 * | 11/2009 | Moussa | B29C 71/04 134/57 R |
| 2010/0297432 A1 | 11/2010 | Sherman et al. | |
| 2014/0202997 A1 | 7/2014 | Vadali et al. | |
| 2014/0255666 A1 | 9/2014 | Stucker et al. | |
| 2015/0142153 A1 | 5/2015 | Chun et al. | |
| 2015/0165675 A1 | 6/2015 | Dawson et al. | |

FOREIGN PATENT DOCUMENTS

| | | |
|---|---|---|
| EP | 1501669 B1 | 11/2010 |
| WO | WO-2014074954 A2 | 5/2014 |

OTHER PUBLICATIONS

Ramos, J.A. et al. "Surface Roughness Enhancement of Indirect-SLS Metal Parts by Laser Surface Polishing," In Solid Freeform Fabrication Proceedings (2001); 28-38.

Rosa, Benoit et al. "Laser Polishing of additive laser manufacturing surfaces", Journal of Laser Applications 27, No. S2 (Feb. 2015), S29102-2.

Stanbury, J.W., et al. "3D Printing with Polymers: Challenges Among Expanding Options and Opportunities", Jan. 2016, http://www.sciencedirect.com/science/article/pii/S0109564115004145.

New Material Science and Technology, Sep. 30, 2012.

* cited by examiner

FINISHING A 3D PRINTED OBJECT

BACKGROUND

In three-dimensional (3D) printing, an additive printing process is often used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Generally speaking, 3D printed objects that are printed using, for instance, a multi-jet fusion process, may have a relatively rough surface caused by poor surface flatness on a microscale level along with partially melted powder particles attached to the surfaces of the objects. The presence of the extra powder particles may also degrade the optical appearance of the objects because the extra powder particles may have a different color than the main bodies of the objects. For instance, the extra powder particles may result in the colors of the 3D printed objects being duller than intended. These issues may arise due to temperature gradients near the 3D printed object's surface. That is, uniform melting of the surface of the 3D printed object and the attached powder particles may require excessive heating, which may cause the 3D printed object to be distorted. The distortion may be avoided by maintaining the temperature within the bulk of the 3D printed object sufficiently low, but this may result in the 3D printed object having a relatively rough surface.

Disclosed herein are an apparatus for finishing a three-dimensional (3D) printed object and a method for implementing the apparatus. As discussed in greater detail herein, the apparatus disclosed herein may apply a pulse of radiation onto the 3D printed object that is of sufficient intensity to cause an outer portion of the 3D printed object to begin to melt and flow. In addition, the pulse of radiation may be applied at a sufficiently low intensity to prevent an interior portion of the 3D printed object to begin to melt to thus prevent the 3D printed object from becoming distorted. Moreover, the pulse of radiation may be applied for a sufficiently short duration of time to significantly heat only the other portion without raising the temperature of the interior portion of the 3D printed object. As such, for instance, only an outer surface region of the 3D printed object may be heated to a temperature that is sufficient to cause the material to melt and flow. By heating the outer surface region to that temperature, voids in the outer surface may be filled and the extra powder particles may be melted into the surface.

Figure 1A:
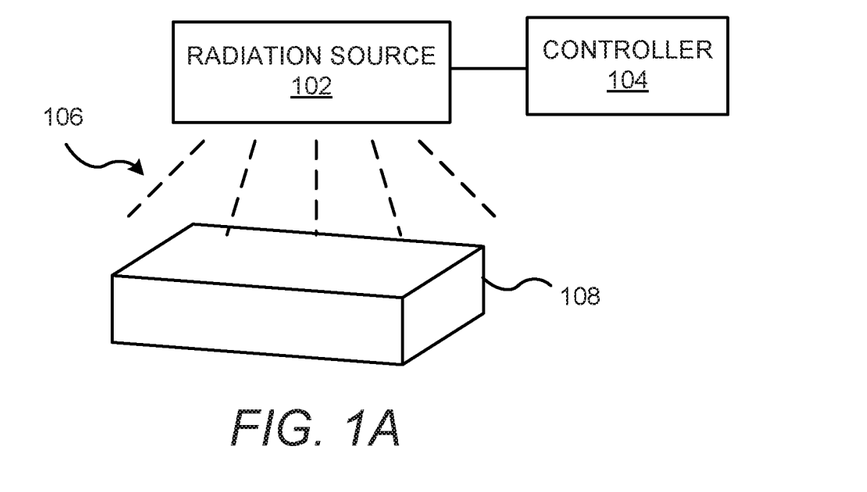
FIG. 1A shows a simplified view of an example apparatus for finishing a surface of a three-dimensional (3D) printed object.

With reference first to FIG. 1A, there is shown a simplified view of an example apparatus 100 for finishing a surface of a three-dimensional (3D) printed object 108. It should be understood that the apparatus 100 depicted in FIG. 1A may include additional components and that some of the components described herein may be removed and/or modified without departing from a scope of the apparatus 100 disclosed herein.

The apparatus 100 is depicted as including a radiation source 102 and a controller 104. The radiation source 102 may be a device that is to provide an instantaneous pulse, burst, flashes, or sub-flashes of radiation in the form of heat and/or light onto a surface of the 3D printed object 108. In addition, the radiation source 102 may be a device that is to apply radiation onto a plurality of surfaces of the 3D printed object 108 in a substantially simultaneous, homogeneous, and uniform manner. By way of example, the radiation source 102 may be a lamp, such as a xenon lamp, a quartz tungsten halogen lamp, or the like. In another example, the radiation source 102 may be laser or a bank of lasers for which the radiation emitted from the laser or lasers may be diffused and homogenized to provide multidirectional and uniform illumination. In any of these examples, the apparatus 100 may include a plurality of radiation sources 102 to uniformly and simultaneously irradiate one or multiple surfaces of the 3D printed object 108.

The controller 104 may be a computing device, a semiconductor-based microprocessor, a central processing unit (CPU), an application specific integrated circuit (ASIC), and/or other hardware processing device. As shown, the controller 104 may be a separate component from the radiation source 102. In other examples, however, the controller 104 may be integrated with the radiation source 102.

The controller 104 may control the radiation source 102 to apply a pulse of radiation 106 onto the 3D printed object 108. More particularly, the controller 104 may control the radiation source 102 to apply the radiation 106 onto the 3D printed object 108 at an intensity (e.g., at an energy level and for a duration of time) that is sufficient to cause an outer portion of about a predetermined thickness of the 3D printed object 108 to begin to melt and flow. In addition, the controller 104 may control the radiation source 102 to apply the pulse of radiation 106 onto the 3D printed object 108 at an intensity (e.g., at an energy level and for a duration of time) that is insufficient to cause portions interior to the outer portion of the 3D printed object 108 to begin to melt.

Accordingly, the controller 104 may control the radiation source 102 to apply a sufficient intensity of energy onto the 3D printed object 108 to cause a portion of the outer surface of the 3D printed object 108 to melt and flow without causing the interior portions of the 3D printed object 108 to melt. In one regard, by causing the portion of the outer surface of the 3D printed object 108 to melt and flow, roughness on the surface of the 3D printed object 108 may be reduced to cause the outer surface of the 3D printed object 108 to be smoothed. In addition, by applying the radiation 106 without causing the interior of the 3D printed object 108 from beginning to melt, application of the pulse of radiation 106 may not cause the shape of the 3D printed object 108 from being distorted.

By way of particular example, the controller 104 may control the radiation source 102 to apply the pulse of radiation 106 such that the outer portion of the 3D printed object 108 at a thickness of between about 20 μm to about 200 μm begins to melt and flow. Similarly to other examples, the pulse of radiation 106 may be of insufficient duration and strength to cause the interior portion of the 3D printed object 108, for instance, inside of the about 20 μm to about 200 μm outer thickness of the 3D printed object 108, from becoming sufficiently heated to begin to melt.

In addition to controlling the radiation source 102, the controller 104 may control the position of the 3D printed object 108 with respect to the radiation source 102. By the way of particular example, after applying a radiation pulse to the part of the 3D printed object 108 facing the radiation source 102, the controller 104 may change the 3D printed object's 108 orientation with respect to the radiation source 102, so that a next radiation pulse may be applied to the part of the 3D printed object 108 that has not yet been irradiated. For instance, the 3D printed object 108 may be positioned on a movable platform (not shown) and the controller 104 may control the movable platform such that different parts of the 3D printed object 108 may face the radiation source 102 at different times.

Figure 1B:
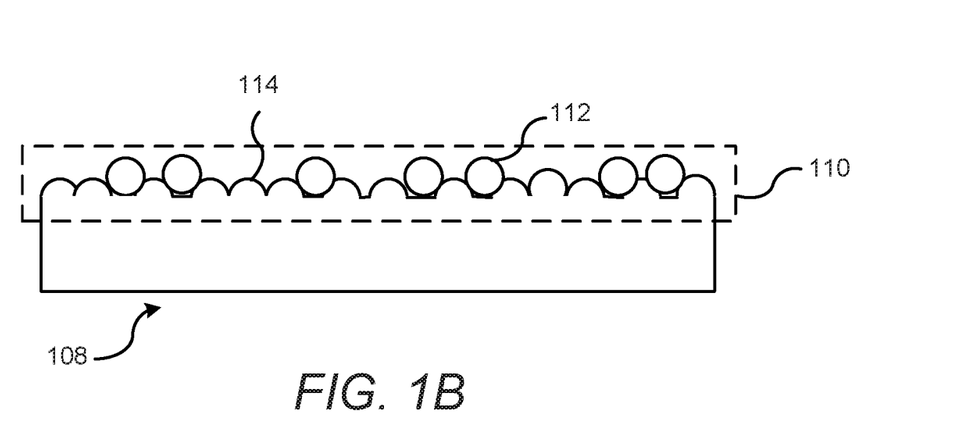
FIGS. 1B and 1C, respectively, depict enlarged simplified side views of a section of an example 3D printed object at a first state prior to receipt of the pulse of radiation and at a second state following receipt of the pulse of radiation.
Figure 1C:
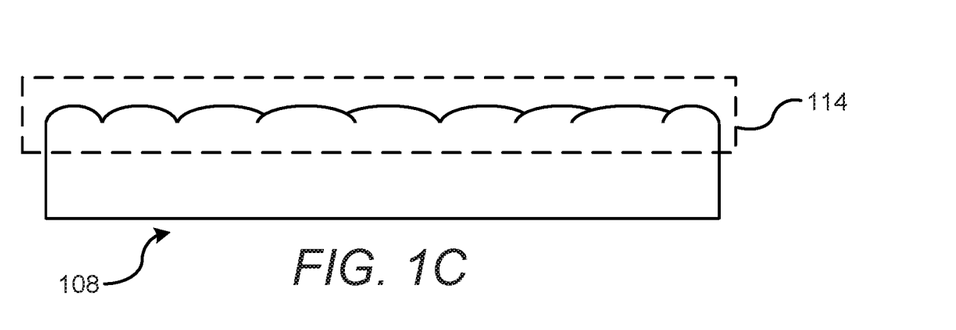

With reference now to FIGS. 1B and 1C, there are respectively shown enlarged simplified side views of a section of an example 3D printed object 108 at a first state prior to receipt of the pulse of radiation 106 and at a second state following receipt of the pulse of radiation 106. As shown in FIG. 1B, the 3D printed object 108 may be formed through a multi-jet fusion process in which powder particles are fused together through application of a fusing agent and heat. During the multi-jet fusion process, excess powder particles 112 may be fused to the outer surface of the 3D printed object 108. That is, for instance, some powder particles 112 upon which fusing agent was not applied may be fused to adjacent powder particles upon which fusing agent was applied because of thermal bleeding between the powder particles. In addition, the excess powder particles 112 may remain fused to the main body of the 3D printed object 108 following, for instance, another finishing process, such as sand blasting of the 3D printed object 108.

As the excess powder particles 112 may not have been intentionally fused to the main body of the 3D printed object 108, the excess powder particles 112 may cause the outer surface of the 3D printed object 108 to have a higher surface roughness than desired. The outer surface of the 3D printed object 108 may also have a higher surface roughness than desired due to partial fusing of powder particles 114 to each other as shown in FIG. 1B. The surface roughness may result in a degraded optical appearance of the 3D printed object 108, for instance, by changing the color of the 3D printed object 108 from saturated to dull. This degradation in the optical appearance may be result from the partial fusing of a colored surface with the uncolored, e.g., white, powder particles from adjacent patterned powder particles.

As shown in FIG. 1C, following application of the pulse of radiation 106 onto the outer portion 110 of the 3D printed object 108, the outer portion 110 may melt and flow. Particularly, the excess powder particles 112 and the partially fused powder particles 114 in the outer portion 110 of the 3D printed object 108 may more completely be fused to the outer surface of the 3D printed object 108. One result of this more complete fusing may be that the outer surface of the 3D printed object 108 may be made to be smoother, which may also improve the optical appearance of the 3D printed object 108.

According to an example, the 3D printed object 108 may be formed of various types of materials. For instance, the powder particles forming the 3D printed object 108 may be polymer particles, metallic particles, ceramic particles, a mixture of polymer, metal, and/or ceramic particles, and the like. In addition, the controller 104 may vary the level of radiation 106 and/or the duration at which the radiation 106 is applied based upon the materials with which the 3D printed object 108 is formed. That is, for instance, the controller 104 may apply a different level of radiation for a different duration of time to cause the outer about 50 μm to about 150 μm outer thickness of the 3D printed object 108 to begin to melt and flow when the 3D printed object 108 is formed of a polymer material as compared with a metal material. In any regard, the controller 104 may control the radiation source 102 to apply the pulse of radiation 106 such that the outer surface of the 3D printed object starts to flow and thus, fill surface voids and depressions while also melting surface attached particles. For instance, the controller 104 may control the radiation source 102 to apply radiation (e.g., heat) at an energy level that is between about 1 J/cm$^2$ to about 50 J/cm$^2$ and for a period of time between about 100 microseconds to about 100 milliseconds.

By way of particular example in which the 3D printed object 108 is formed of polymer particles (polyimide 12) having black colorant (which raises the absorption from about 20% to about 80% in the spectral range between 0.4 μm and 2.0 μm, the controller 104 may control the radiation source 102 to apply radiation (e.g., heat) at about 1 J/cm$^2$ to about 20 J/cm$^2$ and for a period of time between about 1 millisecond to about 100 milliseconds.

In the examples shown in FIGS. 1A-1C, the radiation source 102 is depicted as irradiating a single side of the 3D printed object 108. In other examples, however, multiple sides of the 3D printed object 108 may be irradiated either concurrently or iteratively. For instance, following the irradiation of one side of the 3D printed object 108, the remaining sides of the 3D printed object 108 may be irradiated. Various examples of manners in which the sides of the 3D printed object 108 may be irradiated concurrently or iteratively are described with respect to FIGS. 2A-2C.

Figure 2A:
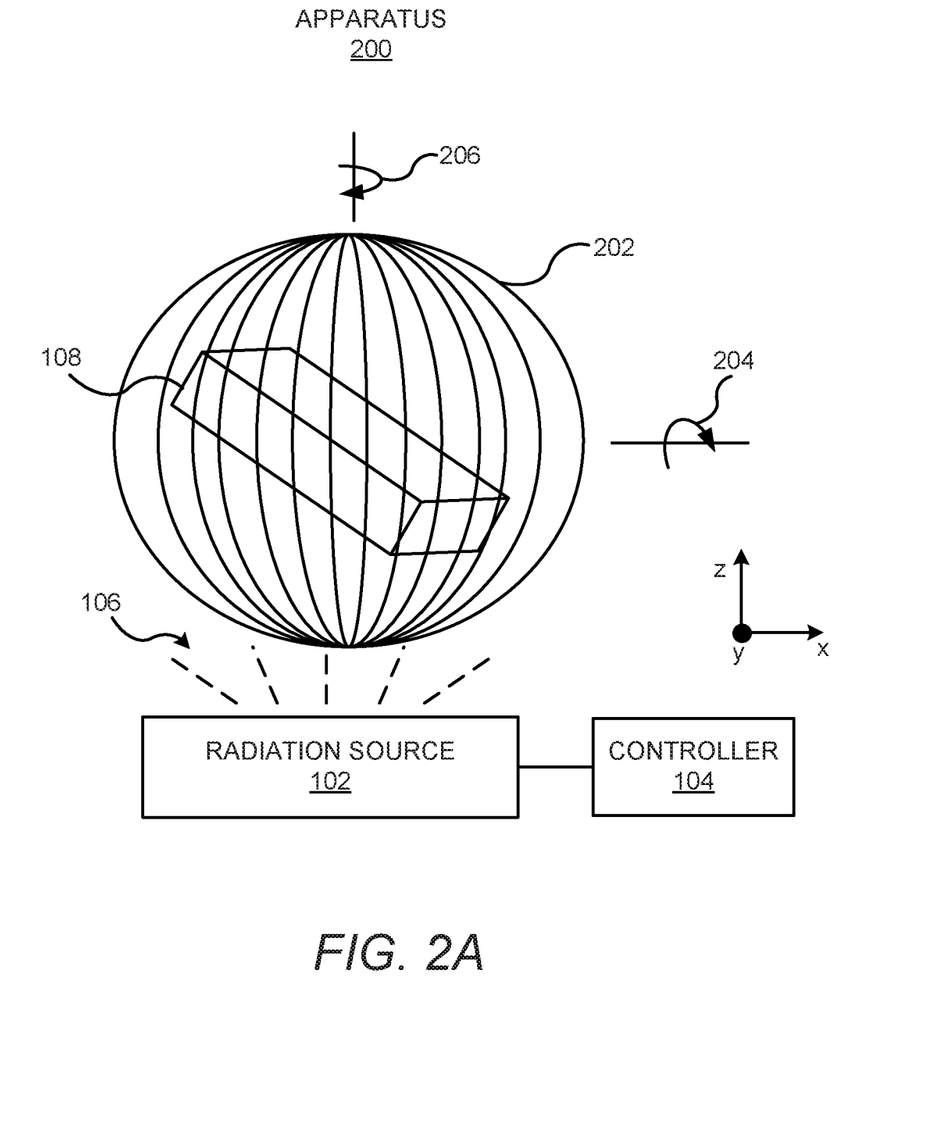
FIGS. 2A-2C, respectively, show simplified block diagrams of example apparatuses that may be employed to concurrently or iteratively irradiate the sides of a 3D printed object.

With reference first to FIG. 2A, there is shown a simplified block diagram of an example apparatus 200 that includes a tumbling cage 202. The tumbling cage 202 may be implemented to rotate the 3D printed object 108 in three dimensions and thereby expose each of the sides of the 3D printed object 108 to the radiation source 102. According to an example, the 3D printed object 108 may be attached to the tumbling cage 202 such that the 3D printed object 108 may rotate in conjunction with the tumbling cage 202. For instance, following insertion of the 3D printed object 108 into the tumbling cage 202, a first side facing the radiation source 102 may be irradiated with a pulse of radiation 106, the tumbling cage 202 may be rotated, and a second side facing the radiation source 102 may be irradiated with a pulse of radiation 106. This process may be repeated until each of the sides of the 3D printed object 108 has been irradiated. The controller 104 may control the position of the tumbling cage 202 such that each of the sides of the 3D printed object 108 may be irradiated.

In another example, the 3D printed object 108 may be inserted into the tumbling cage 202 and may remain unbound to the tumbling cage 202, e.g., the 3D printed object 108 may tumble freely as the tumbling cage 202 is rotated randomly in either or both of the directions shown by the arrows 204 and 206, In addition, as the tumbling cage 202 is rotated, the radiation source 102 may apply radiation 106 onto the 3D printed object 108. The controller 104 may control the radiation source 102 to apply the radiation 106 in short pulses or may control the radiation source 102 to apply the radiation 106 over a relatively longer period of time. For instance, the 3D printed object 108 may be subjected to a sufficiently long exposure such that all of the sides of the 3D printed object 108 may be uniformly irradiated despite the random motion of the tumbling cage 202 and thus, the 3D printed object 108. The controller 104 may control application of the radiation 106 based upon, for instance, the materials from which the 3D printed object 108 was formed, the thickness of the 3D printed object 108, etc.

Figure 2B:
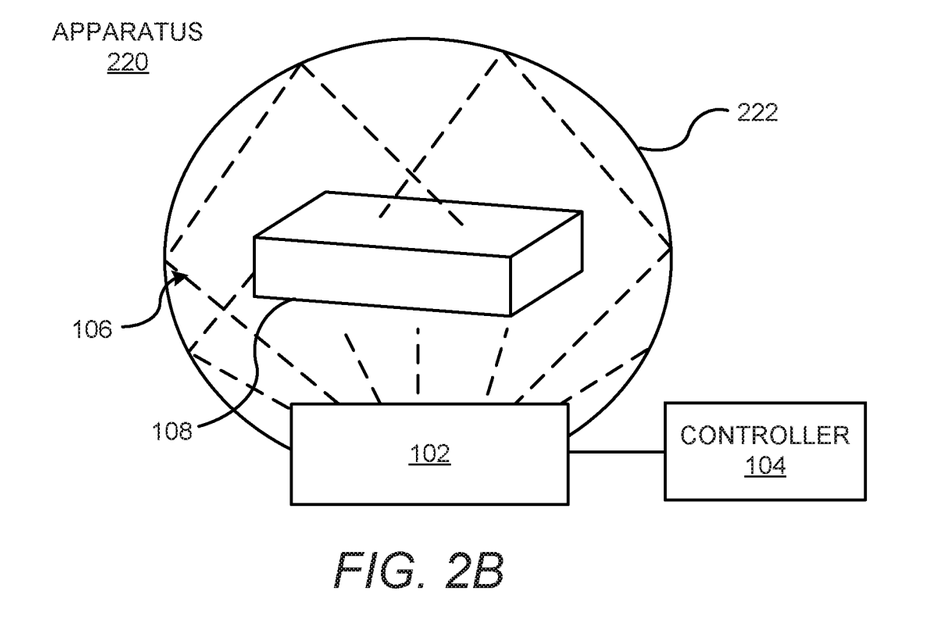

Turning now to FIG. 2B, there is shown a simplified block diagram of an example apparatus 220 that includes a spherical mirror 222, which may also be referred to as an "integrating sphere". As shown in FIG. 2B, the spherical mirror 222 may include reflective surfaces such that radiation 106 emitted from the radiation source 102 may be reflected and applied concurrently on multiple sides of the 3D printed object 108. The controller 104 may control the radiation source 102 to apply a pulse of radiation 106. In addition, the controller 104 may control application of the radiation 106 based upon, for instance, the materials from which the 3D printed object 108 was formed, the thickness of the 3D printed object 108, etc.

Figure 2C:
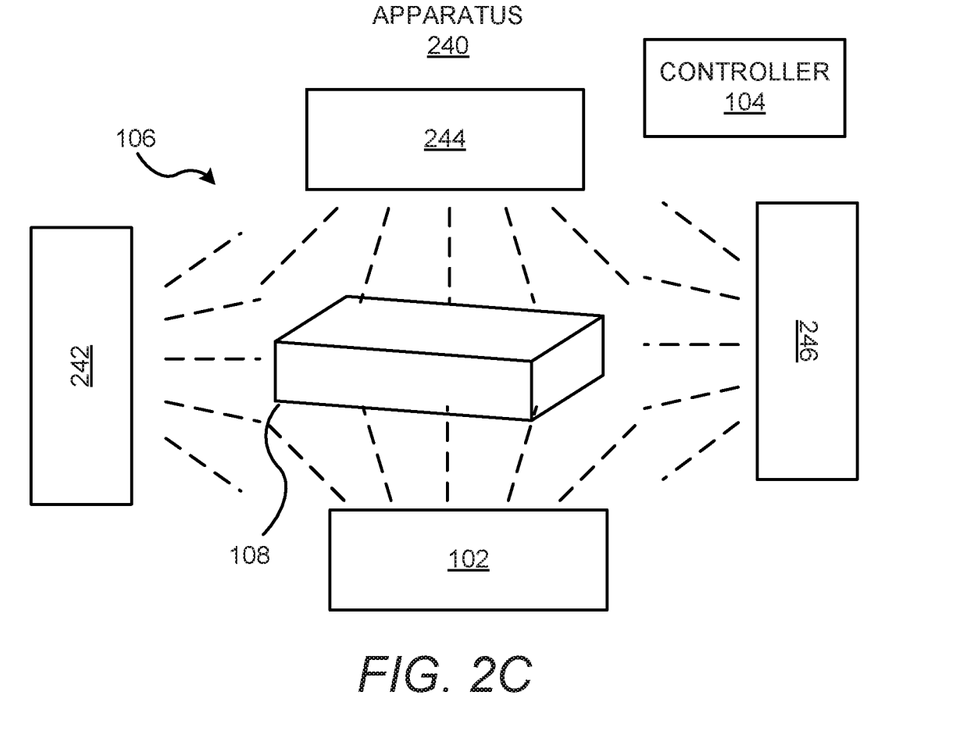

Turning now to FIG. 2C, there is shown a simplified block diagram of an example apparatus 240 that includes a plurality of radiation sources 102 and 242-246. As shown in FIG. 2C, the 3D printed object 108 may be positioned between the radiation sources 102, 242-246 such that the sides of the 3D printed object 108 may be irradiated concurrently. That is, the controller 104 may control each of the radiation sources 102, 242-246 to concurrently output radiation 106 onto the multiple sides of the 3D printed object 108. The controller 104 may control the radiation sources 102, 242-246 to each apply a pulse of radiation 106. In addition, the controller 104 may control application of the radiation 106 based upon, for instance, the materials from which the 3D printed object 108 was formed, the thickness of the 3D printed object 108, etc. The controller 104 may further control each of the radiation sources 102, 242-246 individually to, for instance, apply individual levels of radiation to the sides of the 3D printed object 108. A similar type of apparatus that includes a plurality of radiation sources and mirrors that may direct impinging radiation towards a centrally placed 3D printed object 108 may also be used to irradiate the 3D printed object 108.

Figure 3:
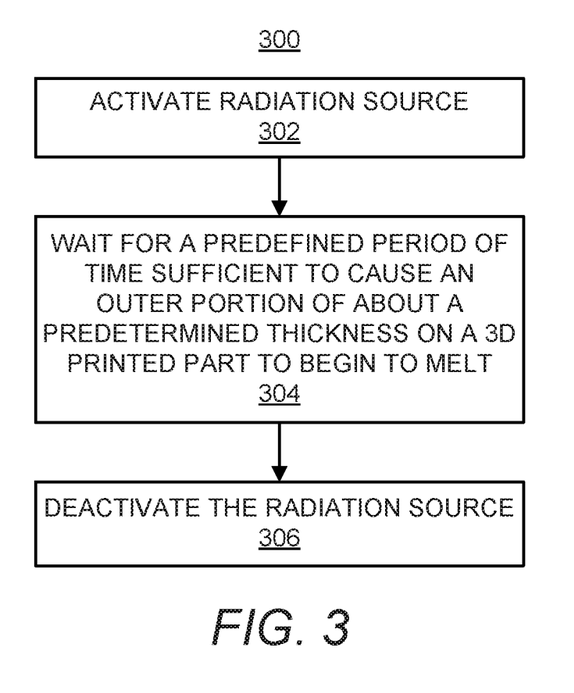
FIGS. 3 and 4, respectively, depict flow diagrams of example methods for finishing a surface of a 3D printed object.
Figure 4:
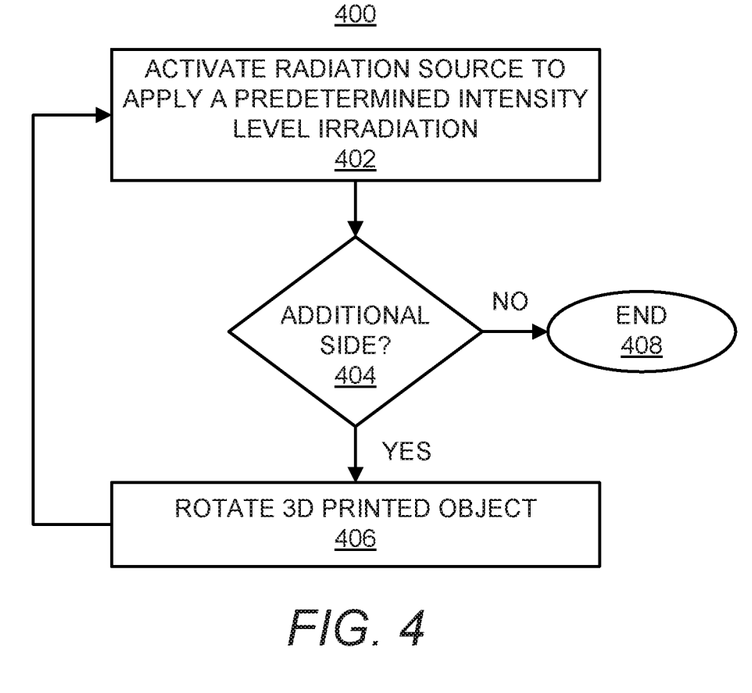

Various manners in which the apparatuses 100, 200, 220, 240 may be implemented are discussed in greater detail with respect to the methods 300 depicted in FIGS. 3 and 4. Particularly, FIGS. 3 and 4, respectively, depict example methods 300 and 400 for finishing a surface of a 3D printed object 108. It should be apparent to those of ordinary skill in the art that the methods 300 and 400 may represent generalized illustrations and that other operations may be added or existing operations may be removed, modified, or rearranged without departing from the scopes of the methods 300 and 400.

The descriptions of the methods 300 and 400 are made with reference to the apparatuses illustrated in FIGS. 1 and 2A-2C for purposes of illustration. It should, however, be understood that apparatuses having other configurations may be implemented to perform the methods 300 and 400 without departing from the scopes of the methods 300 and 400.

Prior to execution of the methods 300 and 400, and as discussed above, a 3D object 108 may be printed or otherwise formed. In addition, the 3D printed object 108 may also include a relatively rough surface as a result of the printing process. The 3D printed object 108 may also be placed in an apparatus 100, 200, 220, 240 to be irradiated by a radiation source 102 or multiple radiation sources 102, 242-246.

With reference first to FIG. 3, at block 302, a radiation source 102 that is to output radiation onto a surface of the 3D printed object 108 at a preset energy level may be activated. The controller 104 may control the radiation source 102 to output a pulse of radiation 106, e.g., light and/or heat, onto the surface of the 3D printed object 108. In addition, or alternatively, the pulse of radiation 106 may be formed of a plurality of sub-pulses, in which the sub-pulses combined have a duration equal to the pulse.

At block 304, the controller 104 may wait for a predefined period of time that is sufficient to cause an outer portion of about a predetermined thickness of the surface of the 3D printed object 108 to begin to melt and flow. The predefined period of time may be based upon, for instance, the material with which the 3D printed object 108 was formed, the energy level (e.g., temperature, radiation level, etc.) of the radiation applied by the radiation source 102, ambient conditions, etc. According to an example, the energy level at which the radiation is applied and the predefined period of time may be determined through testing of different materials and determined results.

At block 306, the radiation source 102 may be deactivated following expiration of the predefined period of time. Accordingly, for instance, the surface of the 3D printed object 108 may be irradiated with a pulse of radiation 106 (and/or sub-pulses of radiation 106) that is sufficient to cause the outer portion of the 3D printed object 108 to begin to melt and flow without causing the inner portion of the 3D printed object 108 from beginning to melt, thus enabling the 3D printed object 108 to maintain its shape.

With reference now to FIG. 4, at block 402, a radiation source 102 may be activated to apply a predetermined intensity level irradiation onto a surface of the 3D printed object 108. For instance, the controller 104 may implement processes similar to those discussed above with respect to the method 300 onto a first surface or side of the 3D printed object 108.

At block 404, the controller 104 may determine whether an additional side of the 3D printed object 108 is to be irradiated. In response to a determination that an additional side of the 3D printed object 108 is to be irradiated, the controller 104 may cause the 3D printed object to be rotated with respect to the radiation source 102, as indicated at block 406. In an example in which the 3D printed object 108 is supported on a platform or otherwise mounted on a movable element, the controller 104 may control actuators (not shown) to cause the 3D printed object 108 to be rotated. In another example in which the 3D printed object 108 is placed within a tumbling cage 202, the controller 104 may cause the tumbling cage 202 to be rotated. In a further example, the controller 104 may cause the radiation source 102 to be moved with respect to the 3D printed object 108 such that the radiation source 102 faces another side of the 3D printed object 108.

In addition, blocks 402-406 may be repeated until the controller 104 determines that the 3D printed object 108 contains no further sides to be irradiated. In response to that determination, the method 400 may end as indicated at block 408.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

By way of particular example in which the radiation source 102 is a xenon (Xe) flash lamp, a sample 3D printed object was irradiated with a single 15 millisecond flash consisting of fifteen equal sub-flashes with varying % duty (% of 15 millisecond period during which the Xe flash lamp was on). The use of sub-flashes may allow for more efficient use of the energy stored in the system capacitors. In order to evaluate the effect of irradiation intensity, the lamp supply voltage and % duty were varied—voltage between 450V and 650V, and % duty between 50% and 70%. The lamp setting was calibrated with a bolometer allowing for accurate determination of the total energy impinging upon the sample 3D printed object's surface during a single pulse irradiation.

The irradiation caused the surface particles on the sample 3D printed object to be melted, resulting in the surface roughness being reduced and a uniform surface color while not distorting the shape of the 3D printed object. In addition, the improvement of the surface roughness after the flash exposure has been quantified with the laser scanning microscope. Table 1 compares the surface roughness Ra before and after a single 15 millisecond Xe flash exposure for a material PA11 (e.g., Nylon 11 or Polyamide 11) and for a PA12 (Nylon 12 or Polyamide 12). The sample 3D printed objects were printed under different conditions causing difference in roughness of the as-printed surfaces. A significant improvement of the surface roughness has been observed regardless of the original surface condition.

Table 1. Examples of the surface roughness improvement by a single flash irradiation, where Ra is the arithmetic average of the absolute values of the profile height deviations from the mean line, recorded within the evaluation length.

| Material | Color | Ra as-is ($\mu$m) | Ra after Xe flash ($\mu$m) |
| --- | --- | --- | --- |
| PA11 | BLACK | 10.434 | 2.207 |
| PA11 | BLACK | 13.335 | 2.156 |
| PA12 | BLUE | 15.503 | 5.441 |
| PA12 | WHITE | 24.001 | 4.733 |
| PA12 | WHITE | 22.715 | 3.774 |
| PA12 | BLACK | 9.395 | 3.126 |
| PA12 | BLACK | 9.181 | 4.0175 |
| PA12 | BLACK | 8.182 | 3.429 |
| PA12 | BLACK | 6.920 | 3.431 |

Figure 5:
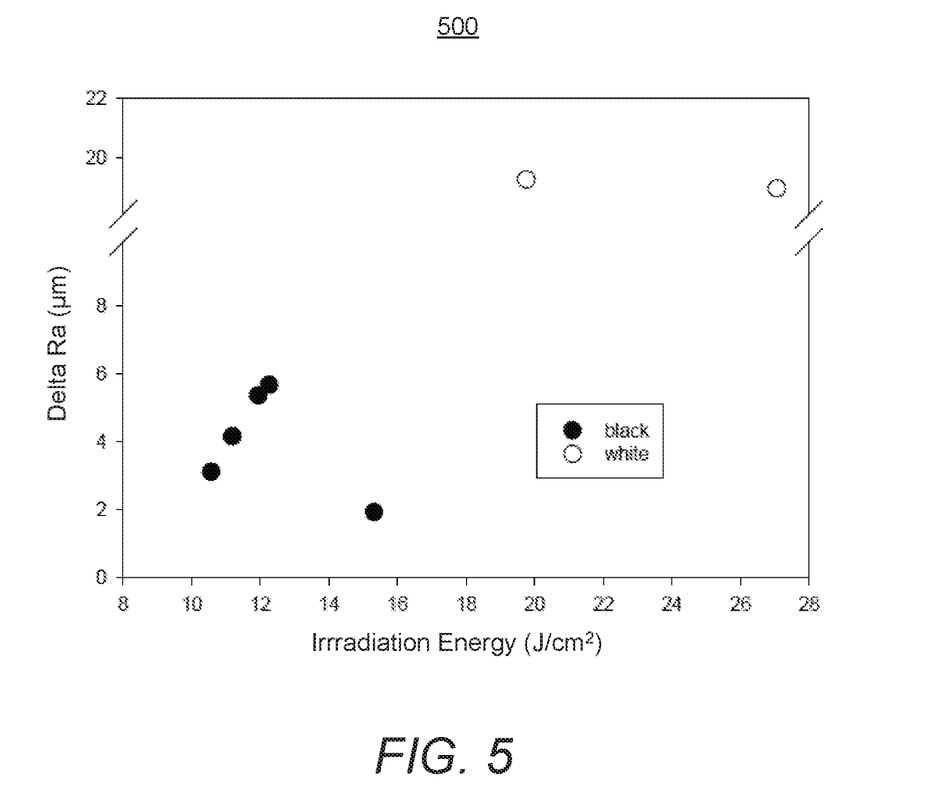
FIG. 5 shows a graph depicting an example correlation between the change in the surface roughness of a 3D printed object and irradiation energy applied to the 3D printed object.

Generally speaking, irradiation induced improvement of the surface roughness may depend on the energy dose delivered during a single flash from the energy source. When the energy is too low, the surface temperature may not rise sufficiently high to melt the thin surface layer of the 3D printed object, whereas, too high of an energy may cause melt convective movement, resulting in a large surface roughness as shown in FIG. 5. The results in FIG. 5 were obtained for a specific irradiation pulse (one 15 millisecond pulse made of 15 equal sub-pulses). The results may likely be different for different pulse conditions.

FIG. 5 shows a graph 500 depicting an example correlation between the change in the surface roughness of a 3D printed object and irradiation energy applied to the 3D printed object (using a single pulse irradiation as described above). In the graph 500, Delta Ra is the roughness (Ra) difference between the "as-is" and the irradiated surface. The graph 400 also shows results obtained for black and white samples. Samples of each color group have an "as-is" surface roughness characteristics for its color (about 9.9 $\mu$m in case of black samples and about 24.1 $\mu$m in case of white samples). In both cases, the final surface roughness was between 2.2 $\mu$m and 3.4 $\mu$m. The graph 500 shows that in this case, the optimum irradiation energy for black samples with original Ra surface roughness of about 10 $\mu$m is at around 13 J/cm$^2$. The optimum energy for white samples is higher (due to the lower light absorption) and equal about 19 J/cm$^2$. A lower irradiation energy may be insufficient to liquefy the surface layer, while a higher energy may introduce surface roughness due to uncontrolled movement of the liquefied surface region.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
a radiation source; and
a controller to:
control the radiation source to apply a pulse of radiation onto a first side of a three-dimensional (3D) printed object at an energy level and for a duration of time that are sufficient to cause an outer portion of about a predetermined thickness of the first side of the 3D printed object to begin to melt and flow, wherein the energy level and the duration of time at which the pulse of radiation is applied are insufficient to cause portions interior to the outer portion to begin to melt;
cause the 3D printed object to be rotated to a position in which a second side of the 3D printed object faces the radiation source; and
control the radiation source to apply a pulse of radiation for a duration of time onto the second side of the 3D printed object to cause an outer portion of the second side to begin to melt and flow.

2. The apparatus according to claim 1, wherein the 3D printed object is formed of fused powder particles, wherein the energy level and the duration of time are also sufficient to cause excess powder particles on an outer surface of the 3D printed object to melt and flow, and wherein the powder particles are particles of a material selected from a polymer, a metal, a ceramic, and a mixture of any of a polymer, a metal, and a ceramic material.

3. The apparatus according to claim 1, wherein the controller is further to control the radiation source to apply the pulse of radiation at an energy level of between about 1 $J/cm^2$ to about 50 $J/cm^2$ and for a duration of time lasting between about 100 microseconds to about 100 milliseconds.

4. The apparatus according to claim 1, wherein the 3D printed object includes a third side, said apparatus further comprising:
a plurality of radiation sources to simultaneously apply the pulse of radiation onto the first and third sides of the 3D printed object.

5. The apparatus according to claim 1, wherein the radiation source comprises one of a xenon lamp, a quartz tungsten halogen lamp, and a laser.

6. An apparatus comprising:
an energy source;
a spherical mirror; and
a controller to control the energy source to apply a pulse of energy into an interior of the spherical mirror at an energy level and for a duration of time that are sufficient to cause excess powder particles on an outer surface of a three-dimensional (3D) printed object positioned within the spherical mirror to melt and flow, wherein the energy level and the duration of time at which the pulse of energy is applied are insufficient to cause fused powder particles in an interior of the 3D printed object to begin to melt.

7. The apparatus according to claim 6, wherein the spherical mirror comprises a spherical shape that is to substantially surround the 3D printed object and includes reflective surfaces in an interior of the spherical mirror, wherein the reflective surfaces are to reflect energy applied into the spherical mirror from the energy source.

8. The apparatus according to claim 6, wherein the controller is to control the energy source to apply the pulse of energy at an energy level of between about 1 $J/cm^2$ to about 50 $J/cm^2$.

9. The apparatus according to claim 6, wherein the controller is to control the energy source to apply the pulse of energy for a duration of time of between about 100 microseconds and about 100 milliseconds.

10. The apparatus according to claim 6, wherein the energy source is one of a xenon lamp, a quartz tungsten halogen lamp, and a laser.

11. An apparatus comprising:
a plurality of radiation sources to direct pulses of radiation toward a common location from multiple directions; and
a controller to:
control the plurality of radiation sources to apply respective pulses of radiation onto multiple sides of a three-dimensional (3D) printed object positioned at the common location, wherein the pulses of radiation are at an energy level and last for a duration of time that are sufficient to cause outer portions of about a predetermined thickness of the multiple sides of the 3D printed object to begin to melt and flow, wherein the energy level and the duration of time at which the pulse of radiation is applied are insufficient to cause portions interior to the outer portions to begin to melt.

12. The apparatus of claim 11, wherein the plurality of radiation sources are positioned to direct the pulses of radiation onto each of the multiple sides of the 3D printed object concurrently.

13. The apparatus of claim 11, wherein the controller is to control the plurality of radiation sources to apply the respective pulses of radiation onto the multiple sides of the 3D printed object simultaneously.

14. The apparatus of claim 11, wherein the controller is to control the plurality of radiation sources to direct the pulses of radiation at an energy level of between about 1 $J/cm^2$ to about 50 $J/cm^2$.

15. The apparatus according to claim 11, wherein the controller is to control the plurality of radiation sources to direct the pulses of radiation for a duration of time of between about 100 microseconds and about 100 milliseconds.

* * * * *